US012315117B2

(12) United States Patent
Luo et al.

(10) Patent No.: US 12,315,117 B2
(45) Date of Patent: May 27, 2025

(54) ILLUMINATION FIELD NON-UNIFORMITY DETECTION SYSTEM, DETECTION METHOD, CORRECTION METHOD, AND DEVICE

(71) Applicant: THE INSTITUTE OF OPTICS AND ELECTRONICS, THE CHINESE ACADEMY OF SCIENCES, Sichuan (CN)

(72) Inventors: Xiangang Luo, Sichuan (CN); Lixin Zhao, Sichuan (CN); Yu He, Sichuan (CN); Yi Li, Sichuan (CN); Sihan Wu, Sichuan (CN); Jinhua Feng, Sichuan (CN); Hongyu Shao, Sichuan (CN); Shaoyu Zhang, Sichuan (CN)

(73) Assignee: THE INSTITUTE OF OPTICS AND ELECTRONICS, THE CHINESE ACADEMY OF SCIENCES, Sichuan (CN)

(*) Notice: Subject to any disclaimer, the term of this patent is extended or adjusted under 35 U.S.C. 154(b) by 0 days.

(21) Appl. No.: 18/575,783

(22) PCT Filed: Dec. 16, 2022

(86) PCT No.: PCT/CN2022/139681
§ 371 (c)(1),
(2) Date: Dec. 29, 2023

(87) PCT Pub. No.: WO2024/021449
PCT Pub. Date: Feb. 1, 2024

(65) Prior Publication Data
US 2024/0265500 A1    Aug. 8, 2024

(30) Foreign Application Priority Data

Jul. 29, 2022   (CN) .......................... 202210914322.1
Jul. 29, 2022   (CN) .......................... 202210919563.5

(51) Int. Cl.
*G06T 5/50*     (2006.01)
*G01J 3/28*     (2006.01)
*G06T 7/00*     (2017.01)

(52) U.S. Cl.
CPC .................. *G06T 5/50* (2013.01); *G01J 3/28* (2013.01); *G06T 7/0002* (2013.01); *G06T 2207/10152* (2013.01); *G06T 2207/20212* (2013.01)

(58) Field of Classification Search
CPC ..................... G06T 5/50; G06T 7/0002; G06T 2207/10152; G06T 2207/20212; G01J 3/28
See application file for complete search history.

(56) References Cited

U.S. PATENT DOCUMENTS 5,074,661 A * 12/1991  Reynolds ............... G01B 11/16
                                                         356/237.2
5,762,528 A *  6/1998  Ninomiya ............. H01J 9/2272
                                                         445/63
(Continued)

FOREIGN PATENT DOCUMENTS

CN       101036777 A  *  9/2007
CN       100477806 C  *  4/2009
(Continued)

OTHER PUBLICATIONS

WIPO/ISA/CNIPA, International Search Report and Written Opinion issued on Apr. 24, 2023 in PCT/CN2022/139681, 8 pages.

*Primary Examiner* — Michael Lee
(74) *Attorney, Agent, or Firm* — J. Peter Paredes; Amin Wasserman Gurnani LLP

(57) ABSTRACT

Provided are illumination field non-uniformity detection system, detection method, correction method, and device
(Continued)

provided. The system includes displacement control module, controlling displacement platform to drive photodetector and image sensor to move within illumination field; illumination signal acquisition module, controlling the photodetector to collect different response signals at various collecting frequencies within the illumination field and controlling the image sensor to collect response images within the illumination field; data processing module, obtaining, based on different response signals, multiple illumination fields with different light radiation intensities and light intensity distribution considered to be uniform; based on this, obtaining multiple corrected image sensor grayscale matrices; fitting the multiple corrected image sensor grayscale matrices to obtain parameter matrix; and non-uniformity detection module, correcting the response images based on the parameter matrix; and characterizing non-uniformity of light intensity distribution within the illumination field using non-uniform metrics of grayscale distribution of the corrected response images.

19 Claims, 6 Drawing Sheets

(56) References Cited

U.S. PATENT DOCUMENTS

| | | | | |
|---|---|---|---|---|
| 6,552,495 | B1 * | 4/2003 | Chang | F21V 23/0457 |
| | | | | 315/159 |
| 8,730,130 | B1 * | 5/2014 | Pray | G03B 43/00 |
| | | | | 345/8 |
| 2007/0262235 | A1 | 11/2007 | Pertsel | |
| 2012/0257371 | A1 * | 10/2012 | Keniston | G03B 27/323 |
| | | | | 362/17 |
| 2013/0135695 | A1 * | 5/2013 | Han | H04N 1/02835 |
| | | | | 358/475 |
| 2013/0278578 | A1 * | 10/2013 | Vetsuypens | G09G 5/02 |
| | | | | 345/207 |
| 2016/0224861 | A1 * | 8/2016 | Vogh, Jr. | G06V 10/56 |
| 2016/0274386 | A1 * | 9/2016 | Lv | G02F 1/1309 |
| 2020/0365113 | A1 * | 11/2020 | Chen | G09G 5/02 |
| 2021/0239603 | A1 * | 8/2021 | Jasperse | G01N 33/491 |

FOREIGN PATENT DOCUMENTS

| | | |
|---|---|---|
| CN | 107036710 A | 8/2017 |
| CN | 112304424 A | 2/2021 |
| CN | 115265767 A | 11/2022 |
| CN | 115265772 A | 11/2022 |

* cited by examiner

ILLUMINATION FIELD NON-UNIFORMITY DETECTION SYSTEM, DETECTION METHOD, CORRECTION METHOD, AND DEVICE

CROSS-REFERENCE TO RELATED APPLICATIONS

The present application claims priority to PCT application serial no. PCT/CN2022/139681, which claims the priority to the Chinese patent applications with the filing No. 202210919563.5 and the filing No. 202210914322.1 filed with the Chinese Patent Office on Jul. 29, 2022, the contents of which are incorporated herein by reference in their entireties.

TECHNICAL FIELD

The present disclosure relates to the technical field of illumination non-uniformity, specifically to an illumination field non-uniformity detection system, a detection method, a correction method, and a device.

BACKGROUND ART

Currently, in some precision machining fields, there is a high demand for the non-uniformity of the light intensity distribution of the illumination field over a certain area. In order to meet the high precision requirements of the detected system for the detection results, there are higher demands on the accuracy of the detection equipment, the consistency of the detection results with the state of the detected system, and the repeatability of the detection method.

The light intensity is typically detected using photodetectors such as photometers, illuminance meters, etc., which can measure the light intensity within the sensitivity range of the detector. However, when evaluating the distribution of light intensity of the illumination field over a certain area, relying on a single photodetector to discretely collect the light intensity within the illumination field is often limited by the size of the sensing area of sensor itself. Therefore, there is an inability to meet the requirements for detecting the light intensity of the illumination field over a large area. Simultaneously, the time cost of detection is high, and when photodetectors are used for a long period, ensuring the stability of the detection results becomes challenging. By using an image sensor, such as a Charge-coupled Device, CCD camera, etc., the distribution of light intensity within the illumination field is reproduced by capturing images of the illumination field, analyzing and utilizing the grayscale values corresponding to pixels in the images, and studying their distribution. This allows for achieving micrometer-level spatial detection accuracy and a detection unit quantity in the order of hundreds of millions in a single capture, depending on the pixel size and resolution of the camera. However, it is found by literature retrieval on the prior art that image sensors themselves exhibit non-uniformity issues. The response outputs of different detection units under identical condition are not entirely consistent. This inherent non-uniformity in the image sensor can impact the detection results when reproducing, by the images, the light-intensity distribution of the illumination field, thus making it impossible to represent the non-uniformity in the light-intensity distribution within the illumination field formed by the detected system.

Existing methods for detecting the illumination uniformity of light sources typically require calibrating the camera lens with a standard light source to mitigate the impact on the light. After minimizing the influence of the camera lens on the light, the illumination uniformity of the light source is reflected by the images captured by the camera. However, there is a lack of standard light sources during the experiment. Moreover, the prior art lacks systems that can simultaneously collect data from both a photodetector and a CCD, and preprocess the data to facilitate subsequent data processing. Additionally, the human-machine interaction level in the related uniformity detection systems is relatively low, making it inconvenient for users to use.

SUMMARY

In view of the aforementioned technical issues, the present disclosure provides an illumination field non-uniformity detection system, a detection method, a correction method, and a device. The objective is to address the technical problems of the lack of systematic detection in illumination field non-uniformity detection and the absence of a standard light source during the experimental process.

In the first aspect of the embodiments of the present disclosure, an illumination field non-uniformity detection system is provided, comprising a displacement control module, configured for controlling a displacement platform to drive a photodetector and an image sensor to move within an illumination field; an illumination signal acquisition module, configured for controlling the photodetector to collect different response signals at various collecting frequencies within the illumination field and controlling the image sensor to collect response images within the illumination field; a data processing module, configured for obtaining, based on the different response signals, multiple illumination fields with different light radiation intensities and these light intensity distributions considered to be uniform; based on the multiple illumination fields with different light radiation intensities and these light intensity distributions considered to be uniform, obtaining multiple corrected image sensor grayscale matrices; and fitting the multiple corrected image sensor grayscale matrices to obtain a parameter matrix; and a non-uniformity detection module, configured for correcting the response images based on the parameter matrix; and characterizing a non-uniformity of the light intensity distribution within the illumination field using non-uniform metrics of the grayscale distribution of the corrected response images.

According to the embodiments of the present disclosure, the illumination signal acquisition module is further configured for controlling the photodetector to collect a power output of the illumination system during a predetermined time period to determine a time domain stability of the illumination system; and controlling, after achieving the time domain stability of the illumination system, the photodetector to collect response signals.

According to the embodiments of the present disclosure, the illumination signal acquisition module is therein provided with a data processing unit, a frequency setting unit, and a frequency verification unit. When the data processing unit is turned on, the data processing unit performs a validity judgment on the data detected by the photodetector each time and serves valid data as response data. When the data processing unit is turned off, the frequency verification unit serves all data detected by the photodetector as response data. The frequency setting unit is configured to set the collection frequency. The frequency verification unit is also configured for verifying, based on all the data, whether the actual frequency of the photodetector collecting the response signals is the same as the collecting frequency.

According to the embodiments of the present disclosure, the data processing unit is provided with a first flag bit and a second flag bit. When the data processing unit is set to the first flag bit, the illumination signal acquisition module continuously stores the collected valid data. When the data processing unit is set to the second flag bit, the illumination signal acquisition module saves an average value of all valid data collected in a single acquisition.

According to the embodiments of the present disclosure, when the collecting frequency is greater than a frequency threshold, the first flag bit is wrapped using an asynchronous callback.

According to the embodiments of the present disclosure, the data processing module obtains, based on the different response signals, multiple illumination fields with different light radiation intensities and the light intensity distribution considered to be uniform, which specifically includes obtaining a vertical dimension of an illumination field considered to be uniform based on a distribution curve of response data collected by the photodetector in a column corresponding to a vertex of a distribution curve of the response data collected in any row of the illumination field; and obtaining a horizontal dimension of the illumination field considered to be uniform based on a distribution curve of response data collected in the row corresponding to the vertex of the distribution curve of the response data collected in the column; alternatively, obtaining multiple initial horizontal dimensions based on the distribution curves of response data collected by the photodetector in each row of the illumination field, and determining a smallest initial horizontal dimension among the multiple initial horizontal dimensions as a horizontal dimension of the illumination field considered to be uniform; and obtaining multiple initial vertical dimensions based on the distribution curves of response data collected by the photodetector in each column of the illumination field, and determining a smallest initial vertical dimension among the multiple initial vertical dimensions as a vertical dimension of the illumination field considered to be uniform; alternatively, obtaining a horizontal dimension of the illumination field based on the distribution curve of response data collected by the photodetector in any row of the illumination field; and obtaining a vertical dimension of the illumination field based on the distribution curve of response data collected by the photodetector in any column of the illumination field.

According to the embodiments of the present disclosure, based on the multiple illumination fields with different light radiation intensities and the light intensity distribution considered to be uniform, the data processing module obtains multiple corrected image sensor grayscale matrices, specifically including obtaining the image response values of all pixel points at each target position, acquired by using the horizontal dimension and the vertical dimension of the uniform illumination field as step lengths of the image sensor in the horizontal direction and the vertical direction, respectively, and constituting an original image of the target position, respectively; and processing the original image to obtain a calibration image and obtaining a corrected image sensor grayscale matrix based on the grayscale of each pixel point of the calibration image.

According to the embodiments of the present disclosure, the step of processing the original image to obtain a calibration image specifically includes intercepting an image region in the original image at each target position with the horizontal dimension and the vertical dimension as the length and the width, and stitching image regions into a first intermediate image; and traversing each pixel point in the first intermediate image with windowing, and changing the image response value of pixel points that do not meet the preset conditions to the average or median of the image response values of all pixel points within the window in the first intermediate image, to obtain the calibration image; or traversing each pixel point in the original image of each target position with windowing, and changing the image response value of pixel points that do not meet the preset conditions to the average or median of the image response values of all pixel points within the window in the original image, to obtain a second intermediate image corresponding to each target position; and intercepting an image region in the second intermediate image at each target position with the horizontal dimension and the vertical dimension as the length and the width, and stitching image regions into a calibration image.

According to the embodiments of the present disclosure, the displacement control module controls a displacement platform to drive a photodetector and an image sensor to move in a stepwise manner in a shape of a Chinese character "弓" within an illumination field.

In the second aspect of the embodiments of the present disclosure, an illumination field non-uniformity detection method is provided, comprising the displacement control module controlling a displacement platform to drive a photodetector and an image sensor to move within an illumination field; the illumination signal acquisition module controlling the photodetector to collect different response signals at various collecting frequencies within the illumination field and controlling the image sensor to collect response images within the illumination field; the data processing module obtaining, based on the different response signals, multiple illumination fields with different light radiation intensities and the light intensity distribution considered to be uniform; based on the multiple illumination fields with different light radiation intensities and the light intensity distribution considered to be uniform, obtaining multiple corrected image sensor grayscale matrices; fitting the multiple corrected image sensor grayscale matrices to obtain a parameter matrix; the non-uniformity detection module correcting the response images based on the parameter matrix; and characterizing a non-uniformity of the light intensity distribution within the illumination field using non-uniform metrics of the grayscale distribution of the corrected response images.

In the third aspect of the embodiments of the present disclosure, a correction method of the illumination field non-uniformity detection system is provided. The non-uniformity detection system comprises a displacement platform and a photodetector and an image sensor mounted on the displacement platform, and the correction method comprises close mounting a pinhole to a sensor surface (photosensitive surface) of the photodetector, and allowing the light from the illumination field to generate a response on the sensor surface of the photodetector only through the pinhole; controlling a displacement platform to drive the photodetector mounted with the pinhole to stepwise scan the target position in the illumination field and collect response signals, and obtaining an illumination field where the light intensity distribution is considered to be uniform, according to the distribution of the response signals in the horizontal direction and vertical direction; at each light radiation intensity, controlling the displacement platform to drive the image sensor to stepwise scan the target position in the illumination field and collect response images, and processing the response image based on the illumination field where the light intensity distribution is considered to be uniform, to obtain the calibration image; fitting multiple calibration images obtained at different light radiation intensities to obtain a calibration parameter; and correcting a to-be-calibrated response image acquired by the image sensor at an arbitrary radiation intensity according to the calibration parameter, and determining the non-uniformity of the light intensity distribution within the illumination field in the current state by the non-uniformity of the grayscale distribution of the corrected to-be-calibrated response image.

According to the embodiments of the present disclosure, the method further comprises determining a time domain stability of the illumination system by capturing the power output of the illumination system by a photodetector at a predetermined time period; and, after the time domain stability of the illumination system has been achieved, close mounting a pinhole to a sensor surface of the photodetector.

According to the embodiments of the present disclosure, the step of obtaining an illumination field where the light intensity distribution is considered to be uniform, according to the distribution of the response signals in the horizontal direction and vertical direction, specifically includes setting a non-uniformity index; and calculating a spatial detection range of the illumination field in the horizontal and vertical directions based on the corresponding response values of the response signals in the horizontal and vertical directions and the non-uniformity index as a dimension of the illumination field where the light intensity distribution is considered to be uniform.

According to the embodiments of the present disclosure, the step of processing the response image based on the illumination field where the light intensity distribution is considered to be uniform specifically includes intercepting an image region at each target position in the response image, where a horizontal dimension and vertical dimension of the illumination field where the light intensity distribution is considered to be uniform are used as the length and width, respectively, and stitching image regions into a first intermediate image; and traversing each pixel point in the first intermediate image with windowing, and changing the image response value of pixel points that do not meet the preset conditions to the median or average of the image response values of all pixel points within the window in the first intermediate image, to obtain the calibration image; or traversing each pixel point in the response image of each target position with windowing, and changing the image response value of pixel points that do not meet the preset conditions to the median or average of the image response values of all pixel points within the window in the original image, to obtain a second intermediate image corresponding to each target position; and intercepting an image region at each target position in the second intermediate image, where a horizontal dimension and vertical dimension of the illumination field where the light intensity distribution is considered to be uniform are used as the length and width, respectively, and stitching image regions into a calibration image.

According to the embodiments of the present disclosure, the step of fitting multiple calibration images obtained at different light radiation intensities to obtain a calibration parameter comprises performing non-linear fitting on multiple calibration images to obtain calibration parameters that satisfy the condition of minimal residuals, wherein the fitting model used for the non-linear fitting is an S-curve or a high-order curve and the S-curve possesses a middle section having an approximately linear characteristic.

According to the embodiments of the present disclosure, the step of correcting a to-be-calibrated response image acquired by the image sensor at an arbitrary radiation intensity according to the calibration parameter, and determining the non-uniformity of the light intensity distribution within the illumination field in the current state by the non-uniformity of the grayscale distribution of the corrected to-be-calibrated response image specifically includes according to $$\overline{V}'_{(I,J)} = a_{(I,J)} V'_{(I,J)}{}^3 + b_{(I,J)} V'_{(I,J)}{}^2 + c_{(I,J)} V'_{(I,J)} + d_{(I,J)}$$

calculating a corrected grayscale value for each pixel point in the to-be-calibrated response image, where $a_{(I,J)}$, $b_{(I,J)}$, $c_{(I,J)}$, and $d_{(I,J)}$ are the calibration parameters corresponding to pixel point (I, J), $V'_{(I,J)}$ is the grayscale value of pixel point (I, J) before correction and $\overline{V}'_{(I,J)}$ is the grayscale value of pixel point (I, J) after correction; and calculating a non-uniformity index of the light intensity distribution within the illumination field in the current state based on the maximum grayscale value and the minimum grayscale value among the corrected grayscale values of all pixel points.

According to the embodiments of the present disclosure, a step length, controlling a displacement platform to drive the photodetector mounted with the pinhole to stepwise scan the target position in the illumination field, is less than or equal to a diameter of the pinhole.

According to the embodiments of the present disclosure, a horizontal dimension and a vertical dimension of the illumination field where the light intensity distribution is considered to be uniform are used as the step lengths of the image sensor in a horizontal direction and a vertical direction so as to collect response images at each target position.

According to the embodiments of the present disclosure, the method further comprises adjusting the time domain stability of the illumination system in the case of time domain instability in the illumination system, wherein the adjustment method includes at least one of adjusting the parameters of the illumination source of the illumination system through circuit design; or adjusting the parameters of the illumination source of the illumination system through optical materials; or adjusting the parameters of the illumination source of the illumination system constructing a Proportional Integral Derivative model by using temperature feedback, or replacing the illumination source of the illumination system.

In the fourth aspect of the embodiments of the present disclosure, a correction device of the illumination field non-uniformity detection system is provided. The non-uniformity detection system comprises a displacement platform and a photodetector and an image sensor mounted on the displacement platform, and the correction device comprises a mounting module, configured for close mounting a pinhole to a sensor surface of the photodetector, and allowing the light from the illumination field to generate a response on the sensor surface of the photodetector only through the pinhole; an acquisition module, configured for controlling a displacement platform to drive the photodetector mounted with the pinhole to stepwise scan the target position in the illumination field and collect response signals, and obtaining an illumination field where the light intensity distribution is considered to be uniform, according to the distribution of the response signals in the horizontal direction and vertical direction; a processing module, at each light radiation intensity, configured for controlling the displacement platform to drive the image sensor to stepwise scan the target position in the illumination field and collect response images, and processing the response image based on the illumination field where the light intensity distribution is considered to be uniform, to obtain the calibration image; a fitting module, configured for fitting multiple calibration images obtained at different light radiation intensities to obtain a calibration parameter; and a correction module, configured for correcting a to-be-calibrated response image acquired by the image sensor at an arbitrary radiation intensity according to the calibration parameter, and determining the non-uniformity of the light intensity distribution within the illumination field in the current state by the non-uniformity of the grayscale distribution of the corrected to-be-calibrated response image.

The illumination field non-uniformity detection system, detection method, correction method, and device provided according to embodiments of the present disclosure have at least the following technical effects.

By configuring the illumination module to control the photodetector and the image sensor to collect data in the illumination field, it is possible to simultaneously collect data from the photodetector and the CCD. The data processing module obtains, based on the different response signals, multiple illumination fields with different light radiation intensities and light intensity distribution considered to be uniform, which allows for defining a reasonable range for the image sensor before scanning images so as to reducing the impact of human error, machine error, and environmental errors on the detection results, thereby improving the accuracy of the detection results. Moreover, by simultaneously collecting data from the photodetector and the CCD to obtain an optimized parameter matrix, the non-uniform metrics of the grayscale distribution of the corrected response image characterize the non-uniformity of the light intensity distribution within the illumination field, which streamlines the process of detecting illumination non-uniformity, thus enhancing the level of human-machine interaction.

By providing a data processing unit within the illumination signal acquisition module, whether to perform the validity judgment on the detected data is determined based on the turn-on or turn-off of the data processing unit, which enhances the intelligence of the non-uniformity detection system. By configuring the data processing unit with a first flag bit and a second flag bit, the continuous recording of data or single-time recording of data is determined through different flag bits, which further enhances the level of intelligence of the system, thus providing users with more selectable options to meet their needs.

By employing a stepwise manner in a shape of a Chinese character "弓" to scan the data, the displacement platform does not need to return to the initial position after scanning each row before proceeding to scan the next row, which saves scanning time, reduces wear and tear to protect the machine, and increases service life of the machine.

By combining the photodetector and the image sensor, the method first utilizes the photodetector to capture the illumination field where the light intensity distribution is considered to be uniform. Subsequently, the response images obtained by the image sensor are processed based on the illumination field where the light intensity distribution is considered to be uniform, thus obtaining a calibration parameter for the non-uniformity evaluation, which optimizes the application scenarios of the illumination field, and enhances the systematicness of the calibration and correction processes. It is particularly suitable for situations for measuring uniformity indicators of illumination field where standard light sources are lacking.

By employing the S-curve fitting model for non-linear fitting for multiple calibration images, the chosen calibration points for fitting are in the middle section having an approximately linear characteristic, which reduces the need for selecting an excessive number of calibration points, thereby preventing overfitting. The relatively dense calibration points are selected at both ends, which enhances the fitting effect, thereby making it closer to the actual situation. Therefore, the obtained calibration parameters are more accurate, thus leading to more precise correction based on the calibration parameters.

BRIEF DESCRIPTION OF DRAWINGS

The foregoing and other objectives, features, and advantages of the present disclosure will be made clearer by the following description of the embodiments of the present disclosure with reference to the drawings, in the drawings.

DETAILED DESCRIPTION OF EMBODIMENTS

Figure 1:
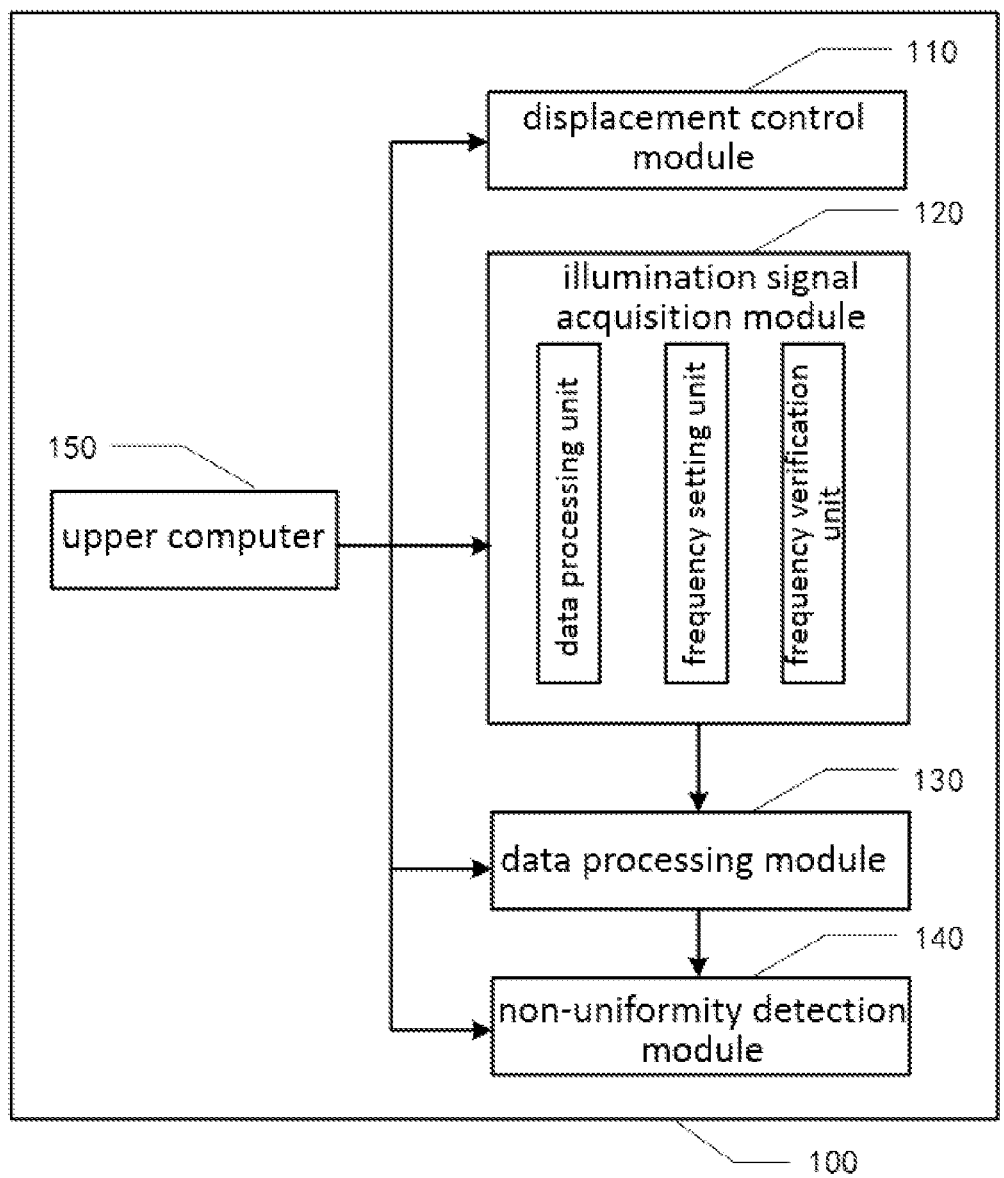
FIG. 1 schematically shows a block diagram of a structure of an illumination field non-uniformity detection system provided in the embodiments of the present disclosure.

In order to clarify the objective, technical solutions, and advantages of the present disclosure, specific embodiments are provided below, referencing the drawings for further detailed explanation. It is evident that the described embodiments are part of the present disclosure, but not an exhaustive representation of all possible embodiments. Based on the embodiments of the present disclosure, all other embodiments obtained by those skilled in the art without inventive effort shall fall within the protection scope of the present disclosure.

The terms used herein are solely for describing specific embodiments and are not intended to limit the present disclosure. Terms such as "comprise", "include", etc., indicate the presence of the mentioned features, steps, operations, and/or components but do not exclude the presence or addition of one or more other features, steps, operations, or components.

In the present disclosure, unless otherwise clearly stipulated and limited, the terms "mount", "link", "connect" and "fix" should be understood in a broad sense, for example, it can be a fixed connection, a detachable connection, or an integral connection, it can be a mechanical connection, an electrical connection, or a communication connection for each other; can be a direct connection, an indirect connection through an intermediary, an internal communication between two components, or the interaction relationship between two components. Those of ordinary skill in the art can understand the meanings of the above terms in the present disclosure according to specific situations.

In the description of the present disclosure, it should be noted that the terms "vertical", "length", "circumferential", "front", "rear", "left", "right", "top", "bottom", "inside", "outside", etc. indicate an orientation or positional relationship based on the orientation or positional relationship shown in the drawings and are intended only to facilitate and simplify the description of the present disclosure, not to indicate or imply that the sub-system or element referred to must be in a particular orientation, or be constructed and operate in a particular orientation, and therefore are not to be construed as limiting the present disclosure.

Throughout the drawings, the same or similar elements are represented by the same or similar reference numerals. When it may cause confusion in understanding the present disclosure, conventional structures or constructions will be omitted. Additionally, the shapes, sizes, and positional relationships of the components in the drawings do not necessarily reflect their actual sizes, proportions, and relative positions. Furthermore, in the claims, any reference signs in parentheses should not be construed as limiting the claims.

Similarly, to streamline the present disclosure and aid in understanding one or more aspects of the disclosure, various features of the disclosure may be grouped together in a single embodiment, drawing, or description in the exemplary embodiments described above. References to terms such as "an embodiment", "some embodiments", "an example", "specific examples", or "some examples" in the description refer to one or more embodiments or examples of the present disclosure that include specific features, structures, materials, or characteristics described in conjunction with that embodiment or example. In the summary, the illustrative expressions for the terms above do not necessarily refer to the same embodiment or example. Moreover, the specific features, structures, materials, or characteristics described may be combined in any suitable manner in one or more embodiments or examples.

Additionally, the terms "first" and "second" are used for descriptive objectives only and should not be understood as indicating or implying relative importance or specifying the quantity of the indicated technical features. Consequently, features labeled with "first" or "second" can explicitly or implicitly include one or more of those features. In the description of the present disclosure, "multiple" means at least two, such as two, three, etc., unless otherwise expressly and specifically limited.

FIG. 1 schematically shows a block diagram of a structure of an illumination field non-uniformity detection system in the embodiments of the present disclosure.

As shown in FIG. 1, the illumination field non-uniformity detection system 100 can, for example, include a displacement control module 110, an illumination signal acquisition module 120, a data processing module 130, and a non-uniformity detection module 140. The displacement control module 110 is configured for controlling a displacement platform to drive a photodetector and an image sensor to move within an illumination field. The illumination signal acquisition module 120 is configured for controlling the photodetector to collect different response signals at various collecting frequencies within the illumination field and controlling the image sensor to collect response images within the illumination field. The data processing module 130 is configured for obtaining, based on the different response signals, multiple illumination fields with different light radiation intensities and the light intensity distribution considered to be uniform; and based on the multiple illumination fields with different light radiation intensities and the light intensity distribution considered to be uniform, obtaining multiple corrected image sensor grayscale matrices, and fitting the multiple corrected image sensor grayscale matrices to obtain a parameter matrix. The non-uniformity detection module 140 is configured for correcting the response images based on the parameter matrix; and characterizing a non-uniformity of the light intensity distribution within the illumination field using non-uniform metrics of the grayscale distribution of the corrected response images.

The illumination field non-uniformity detection system 100 can, for example, also include an upper computer 150, wherein the upper computer 150 is communicatively connected to the displacement control module 110, the illumination signal acquisition module 120, the data processing module 130, and the non-uniformity detection module 140, for controlling each module and saving and displaying the detected data. The upper computer 150 can, for example, comprise a status display module, and the status display module can display the specific position of the displacement platform, the direction of travel, temperature, and other parameters; and the space occupied by the data acquisition, the data collecting frequency measured by the frequency verification unit, and other information.

According to one embodiment of the present disclosure, the illumination signal acquisition module 120 is further configured for controlling the photodetector to collect a power output of the illumination system during a predetermined time period to determine a time domain stability of the illumination system; and controlling, after achieving the time domain stability of the illumination system, the photodetector to collect response signals.

Exemplarily, the displacement control module 110 controls the displacement platform to drive the photodetector to move. The photodetector can stop at any position within the illumination field, and the sensor surface of the photodetector is perpendicular to the illumination optical axis. The illumination signal acquisition module 120 controls the photodetector to collect a power output of the illumination system during a long time period to determine a time domain stability of the illumination system. In a specific example, continuous collection is performed for 8 hours. The specific time period is not restricted by the present disclosure and can be set according to the specific requirements of the actual application.

After achieving the time domain stability in the illumination system, a precision pinhole is mounted on the sensor surface of the photodetector. The displacement control module 110 controls the displacement platform to scan the entire illumination field with the pinhole and the photodetector. The displacement control module 110 can control the staying time of the displacement platform at each scanning position and the step length between adjacent staying positions. At the staying positions of the displacement platform, the illumination signal acquisition module 120 controls the photodetector to collect response signals.

According to one embodiment of the present disclosure, the illumination signal acquisition module 120 is therein provided with a data processing unit, a frequency setting unit, and a frequency verification unit. When the data processing unit is turned on, the data processing unit performs a validity judgment on the data detected by the photodetector each time and considers valid data as response data. When the data processing unit is turned off, the frequency verification unit considers all data detected by the photodetector as response data. The frequency setting unit is configured for setting collecting frequency. The frequency verification unit is also configured for verifying, based on all the data, whether the actual frequency of the photodetector collecting the response signals is the same as the collecting frequency.

Exemplarily, the data processing unit can continuously receive data using the user datagram protocol (UDP) in a multicast manner. The user can choose to turn on or turn off the data processing unit. When turned on, the data processing unit will judge the data received for each collection, determine whether the received data is valid, and discard the non-valid data. When turned off, the data processing unit does not judge the validity of the collected data and stores all collected data, which means that it preserves the raw data. The frequency verification unit saves all the data collected within a selected time period into a txt file, reads the number of byte data in the txt file, and determines whether the collecting frequency is set successfully by the amount of data. When the number of data collected in the txt file in one second is 49-51, it is considered that the currently true collecting frequency is 50 Hz. Multiple data collecting frequencies set by the frequency setting unit can be 50 Hz, 200 Hz, 1 KHz, 2 KHz, or 5 KHz.

In one embodiment of the present disclosure, the data processing unit can further be provided with a first flag bit and a second flag bit, wherein the first flag bit and the second flag bit are independent of each other. Under the condition that the data processing unit is set to the first flag bit, the illumination signal acquisition module 120 continuously saves the collected valid data. Under the condition where the data processing unit is set to the second flag bit, the illumination signal acquisition module 120 saves the average value of all valid data collected in a single collection.

Exemplarily, when the first flag bit is set to true, it continuously saves the collected valid data. When the second flag bit is set to true, all valid data collected for a single staying is averaged and displayed in the table of the upper computer 150, and one cell in the table is stored with the average value taken from the valid data collected during a single staying.

When the first flag bit is set to true, the method of obtaining valid data can be any of the following three ways.

The first method can be: setting upper and lower limits for data collected. When the collected data is within the upper and lower limits of the range, the detected data is valid; when not within the upper and lower limits of the range, the detected data is invalid.

The second method can be: setting the size of a window for implementing filtering by sliding window. The data filtered out is invalid data. The window size should be set, wherein the window size is 2n+1, and the window size should be less than or equal to the number collected during a single staying, where n is a positive integer.

The third method can be: obtaining the data in the range by setting the upper and lower limits first and then performing filtering by sliding window on the obtained data.

In the filtering by sliding the window, the window size and the upper and lower limits for data received can be switched based on the data collecting frequency. After the user sets the collecting frequency using the frequency setting unit, the window size and the upper and lower limits for data received use corresponding default settings. Users can also customize these settings. This ensures that more data is discarded at higher frequencies, thus making the results more realistic and saving time. It is also possible to retain relatively more data when using low-frequency collection.

Further, when the collecting frequency is greater than a frequency threshold, the first flag bit is wrapped using an asynchronous callback.

Exemplarily, when the data collecting frequency is 2 KHz or 5 KHz, the asynchronous callback method can be used to wrap the first flag bit of the data processing unit. Since when the collecting frequency is too high and the actual collecting frequency verified by the first flag bit verifying and the set collecting frequency is high at the same time, the frequency verification program is prone to errors, therefore, wrapping the first flag bit with asynchronous callbacks ensures the smooth progress of frequency verification operation even in high-frequency situations.

According to one embodiment of the present disclosure, the data processing module 130 obtains, based on the different response signals, multiple illumination fields with different light radiation intensities and light intensity distribution considered to be uniform, which can include, for example, any of the following three methods.

The first method can be: obtaining a vertical dimension of an illumination field considered to be uniform based on a distribution curve of response data collected by the photodetector in a column corresponding to a vertex of a distribution curve of the response data collected in any row of the illumination field; obtaining a horizontal dimension of the illumination field considered to be uniform based on a distribution curve of response data collected in the row corresponding to the vertex of the distribution curve of the response data collected in the column. It should be understood that scanning can also be performed first in column and then in row. Specifically, a horizontal dimension of an illumination field considered to be uniform is obtained based on a distribution curve of response data collected by the photodetector in a row corresponding to a vertex of a distribution curve of the response data collected in any column of the illumination field. A vertical dimension of the illumination field considered to be uniform is obtained based on a distribution curve of response data collected in the column corresponding to the vertex of the distribution curve of the response data collected in this row.

The second method can be: obtaining multiple initial horizontal dimensions based on the distribution curves of response data collected by the photodetector in each row of the illumination field, and determining the smallest initial horizontal dimension among the multiple initial horizontal dimensions as a horizontal dimension of the illumination field considered to be uniform; and obtaining multiple initial vertical dimensions based on the distribution curves of response data collected by the photodetector in each column of the illumination field, and determining a smallest initial vertical dimension among the multiple initial vertical dimensions as a vertical dimension of the illumination field considered to be uniform.

The third method can be: obtaining a horizontal dimension of the illumination field based on the distribution of response data collected by the photodetector in any row of the illumination field; and obtaining a vertical dimension of the illumination field based on the distribution of response data collected by the photodetector in any column of the illumination field.

Figure 2:
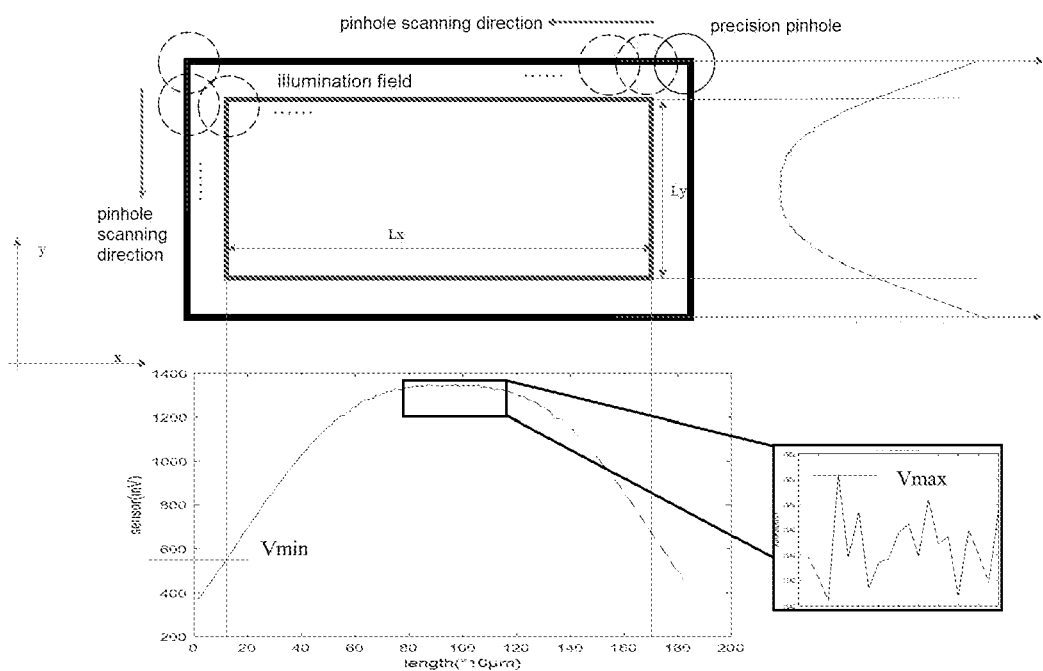
FIG. 2 schematically shows a schematic diagram for acquiring an illumination field that is considered to be uniform, according to the embodiments of the present disclosure.

FIG. 2 schematically shows a schematic diagram for acquiring an illumination field that is considered to be uniform, according to embodiments of the present disclosure.

As shown in FIG. 2, the data processing module 130 receives the data collected by the illumination signal acquisition module 120. The data can be any of the data collected when the data processing unit is turned off, when the first flag bit is true, or when the second flag bit is true.

The distribution curve of the response value V of the photodetector in any row or any column of the illumination field is a parabola. It is possible to have differences in the response curves between rows and columns. The method by which the data processing module 130 obtains the lateral (x-direction) size, of the illumination field considered to be uniform, can be as follows.

The illumination signal acquisition module 120 passes the collected response value V of a certain row of the photodetector to the data processing module 130. The data processing module 130 calculates $PV_V$, and the calculation formula is: $PV_V = (V_{max} - V_{min})/(V_{max} + V_{min}) * 100\%$; When the $PV_V$ value is equal to the preset PV value of the upper computer 150, calculate the $V_{min}$ value:

$$V_{min} = \frac{V_{max}(1+PV)}{1+PV}$$

Then, based on the obtained $V_{min}$ value, the x-directional size $L_x$ of the illumination field considered to be uniform is obtained through the distribution curve of the response values V for that row.

Similarly, the vertical (y-direction) size $L_y$ of the illumination field considered to be uniform can be obtained.

It should be understood that FIG. 2 illustrates the principle of obtaining the horizontal dimension or vertical dimension of the illumination field based on the distribution of response data scanned from a certain row or column. In practical applications, when flexibly selecting any of the three methods mentioned above based on application requirements to obtain the size of a uniform illumination field, each method, where the horizontal dimension or vertical dimension of the illumination field is obtained based on the distribution of response data scanned from a certain row or column, can be referred to as shown in FIG. 2.

It should be noted that the advantage of the first method is that it only requires three scans to obtain $L_x$ and $L_y$, which is more time-efficient for scanning. In practical situations, the distribution curve (quadratic function graphs) of response data for most parts, excluding the edge portions, are generally close. Choosing $L_x$ and $L_y$ in this way is not only fast but also has strong representational significance.

It should be noted that the advantage of the second method is that by performing a global scan of the illumination field, the obtained $L_x$ and $L_y$ are most representative. Additionally, due to the presence of edge effects, to save time, the edge portions can be excluded (e.g., the outermost 5% in all four directions, namely on the top, bottom, left and right is not selected), thus allowing for a comprehensive scan. Finally, the shortest $L_x$ and $L_y$ can be chosen as the final size of the illumination field considered to be uniform.

It should be noted that the advantage of the third method is that it has the shortest scanning time as it involves selecting a random row or column for scanning.

According to one embodiment of the present disclosure, based on the multiple illumination fields with different light radiation intensities and light intensity distribution considered to be uniform, the data processing module 130 obtains multiple corrected image sensor grayscale matrices, which includes, for example, obtaining the image response values of all pixel points at each target position, acquired by using the horizontal dimension and vertical dimension of the uniform illumination field as step lengths of the image sensor in the horizontal direction and vertical direction, respectively, and constituting an original image of the target position, respectively; and processing the original image to obtain a calibration image and obtaining a corrected image sensor grayscale matrix based on the grayscale of each pixel point of the calibration image.

Exemplarily, the displacement control module 110 controls the displacement platform to move in a stepwise manner in the illumination field, and drives the image sensor to move relative to the illumination field. The displacement control module 110 sets the step length in the x-direction of the displacement platform as $L_x$ and the step length in the y-direction as $L_y$. The illumination signal acquisition module 120 controls the image sensor to capture images n times after stepping to the target position. Mean filtering is performed on the n-time image response values of each pixel point collected at the target position, specifically by taking the average, which is $$\overline{V} = \frac{V_1 + V_2 + V_3 + \ldots + V_n}{n}.$$

Finally, the image response values $\overline{V}$ of all pixel points at each target position constitute the original image for that target position. Subsequently, based on the original image, the original-image sensor grayscale matrix is obtained. The image sensor grayscale matrices of all target positions constitute the original grayscale matrix set of the image sensor.

The data processing module 130 uses the original grayscale matrix set of the image sensor to obtain corrected image sensor grayscale matrices, which are stitched together with the aid of the illumination field considered to be uniform to form a desired image sensor grayscale matrix considered to be uniform.

Figure 3:
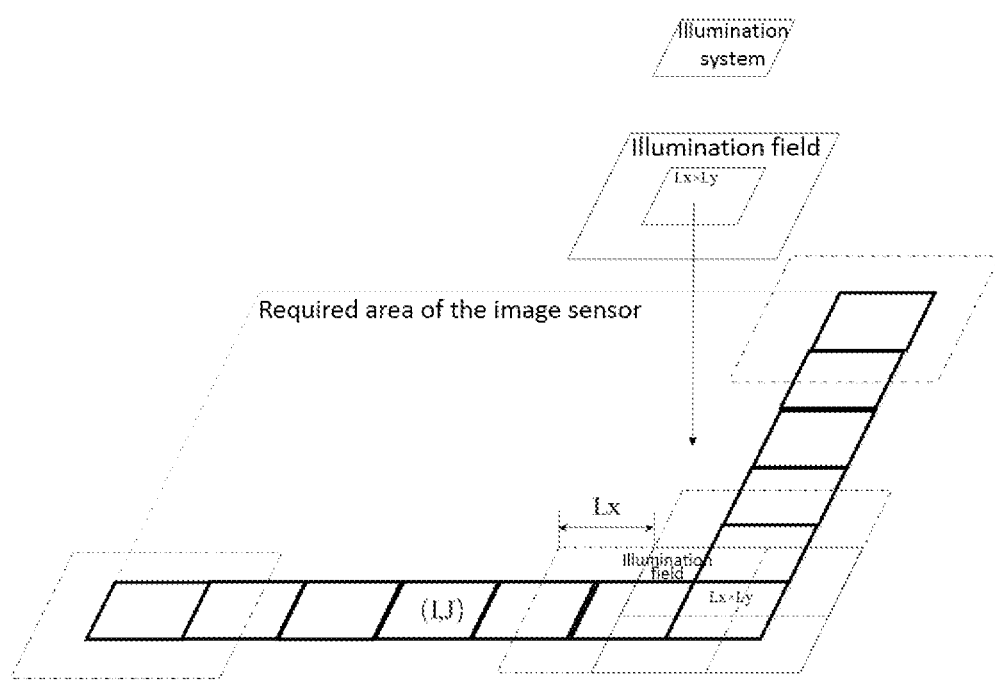
FIG. 3 schematically shows a schematic diagram for acquiring a calibration image according to the embodiments of the present disclosure.

FIG. 3 schematically shows a schematic diagram for acquiring a calibration image according to embodiments of the present disclosure.

As shown in FIG. 3, processing the original image to obtain a calibration image, specifically can include two ways.

One way is intercepting an image region in the original image at each target position with the horizontal dimension and the vertical dimension as the length and width, and stitching image regions into a first intermediate image; and traversing each pixel point in the first intermediate image with windowing, and changing the image response value of pixel points that do not meet the preset conditions to the average or median of the image response values of all pixel points within the window in the first intermediate image, to obtain the calibration image.

Exemplarily, the data processing module 130 first captures the illumination area of $L_x \times L_y$ at the middle of each target position, stitches it into the desired size of the response image of the image sensor (the first intermediate image), and then performs windowed traversal for each pixel in the stitched response image. Taking any pixel (I, J) of the stitched original grayscale matrix as the center, the window size is (2m+1)*(2n+1) pixels for windowed traversal, where m and n are non-negative integers, usually m≥2, n≥2, and the selected pixel (I, J) has I greater than or equal to m+1 and J greater than or equal to n+1. Then, it is determined whether to remove the response of this pixel. The criterion for removing the response value is whether the response value is in the [μ−3σ, μ+3σ] range. Response values outside the [μ−3σ, μ+3σ] range are removed, where μ is the mean of all pixel response grayscale values within the window, and σ^2 is the variance of all response grayscale values within the window. For the removed response values, the median of all image response values ∇ within the window is assigned as the grayscale value of the response image of the pixel, thus obtaining the corrected image sensor grayscale matrix. Pixels where I<m+1 or J<n+1 maintain their original grayscale distribution values unchanged.

Another way is traversing each pixel point in the original image of each target position with windowing, and changing the image response value of pixel points that do not meet the preset conditions to the average or median of the image response values of all pixel points within the window in the original image, to obtain a second intermediate image corresponding to each target position; and intercepting an image region in the second intermediate image at each target position with the horizontal dimension and the vertical dimension as the length and width, and stitching image regions into a calibration image.

Exemplarily, based on the obtained original grayscale matrix set of the image sensor, a window with a size of (2m+1)*(2n+1) pixels can be traversed around any pixel (I, J) in the output image of each target position, where m and n are non-negative integers, usually with m≥2 and n≥2, and the selected pixel (I, J) has I greater than or equal to m+1 and J greater than or equal to n+1. Then, it is determined whether to remove the response of this pixel. The criterion for removing the response value is whether the response value is in the [μ−3σ, μ+3σ] range. Response values outside the [μ−3σ, μ+3σ] range are removed, where u is the mean of all pixel response grayscale values within the window, and σ^2 is the variance of all response grayscale values within the window. For the removed response values, the median of all image response values V within the window is assigned as the grayscale value of the response image of the pixel, thus obtaining the corrected image sensor grayscale matrix at each target position. The grayscale matrix of the response image is intercepted within the $L_x \times L_y$ region around the target position as the center and the corrected image sensor grayscale matrix is stitched at the current radiation intensity at the desired size.

The upper computer 150 adjusts to obtain N different radiation intensities $\varphi_k$ (1≤k≤N) of the illumination field, then repeats the above operation to obtain N corrected image sensor grayscale matrices with the same size. The data processing module 130 uses the least squares fitting method to perform nonlinear fitting on the N corrected image sensor grayscale matrices, thus obtaining a polynomial parameter matrix $\nabla_k$ that has the minimized residuals.

Further, in the acquisition process of the above detection data, the displacement control module 110 can control a displacement platform to drive a photodetector and an image sensor to move in a stepwise manner in a shape of a Chinese character "弓" within an illumination field.

In one embodiment of the present disclosure, the step of correcting the response images based on the parameter matrix; and detecting a non-uniformity of the light intensity distribution within the illumination field using non-uniform metrics of the grayscale distribution of the corrected response images can be, for example, multiplying the actual response output $V_{(I,J)}(\varphi_k)$ of any pixel (I, J) under the radiation intensity $\varphi_k$ by the parameter matrix $\nabla_k$ to obtain the corrected expected matrix; combining the expected matrices of all pixels to form the image sensor response grayscale matrix of the desired size; and using the formula $PV_V = (V_{max} - V_{min})/(V_{max} + V_{min}) * 100\%$ to calculate the value of non-uniformity index of the illumination field.

The illumination field non-uniformity detection system provided according to embodiments of the present disclosure can simultaneously collect data from the photodetector and the CCD. The data processing module 130 obtains, based on the different response signals, multiple illumination fields with different light radiation intensities and light intensity distribution considered to be uniform, which allows for defining a reasonable range for the image sensor before scanning images so as to reducing the impact of human error, machine error, and environmental errors on the detection results, thereby improving the accuracy of the detection results. Moreover, by simultaneously collecting data from the photodetector and the CCD to obtain an optimized parameter matrix, the non-uniformity of the grayscale distribution of the corrected response image characterize the non-uniformity of the light intensity distribution within the illumination field, which streamlines the process of detecting illumination non-uniformity, thus enhancing the level of human-machine interaction. Further, by providing a data processing unit within the illumination signal acquisition module 120, whether to perform the validity judgment on the detected data is determined based on the turn-on or turn-off of the data processing unit, which enhances the intelligence degree of the non-uniformity detection system. By configuring the data processing unit with a first flag bit and a second flag bit, the continuous recording of data or single-time recording of data is determined through different flag bits, which further enhances the level of intelligence of the system, thus providing users with more selectable options to meet their needs. Furthermore, by employing a stepwise manner in a shape of a Chinese character "弓" to scan the data, the displacement platform does not need to return to the initial position after scanning each row before proceeding to scan the next row, which saves scanning time, reduces wear and tear to protect the machine, and increases service life of the machine.

Based on the same inventive concept, embodiments of the present disclosure also provide an illumination field non-uniformity detection method.

Figure 4:
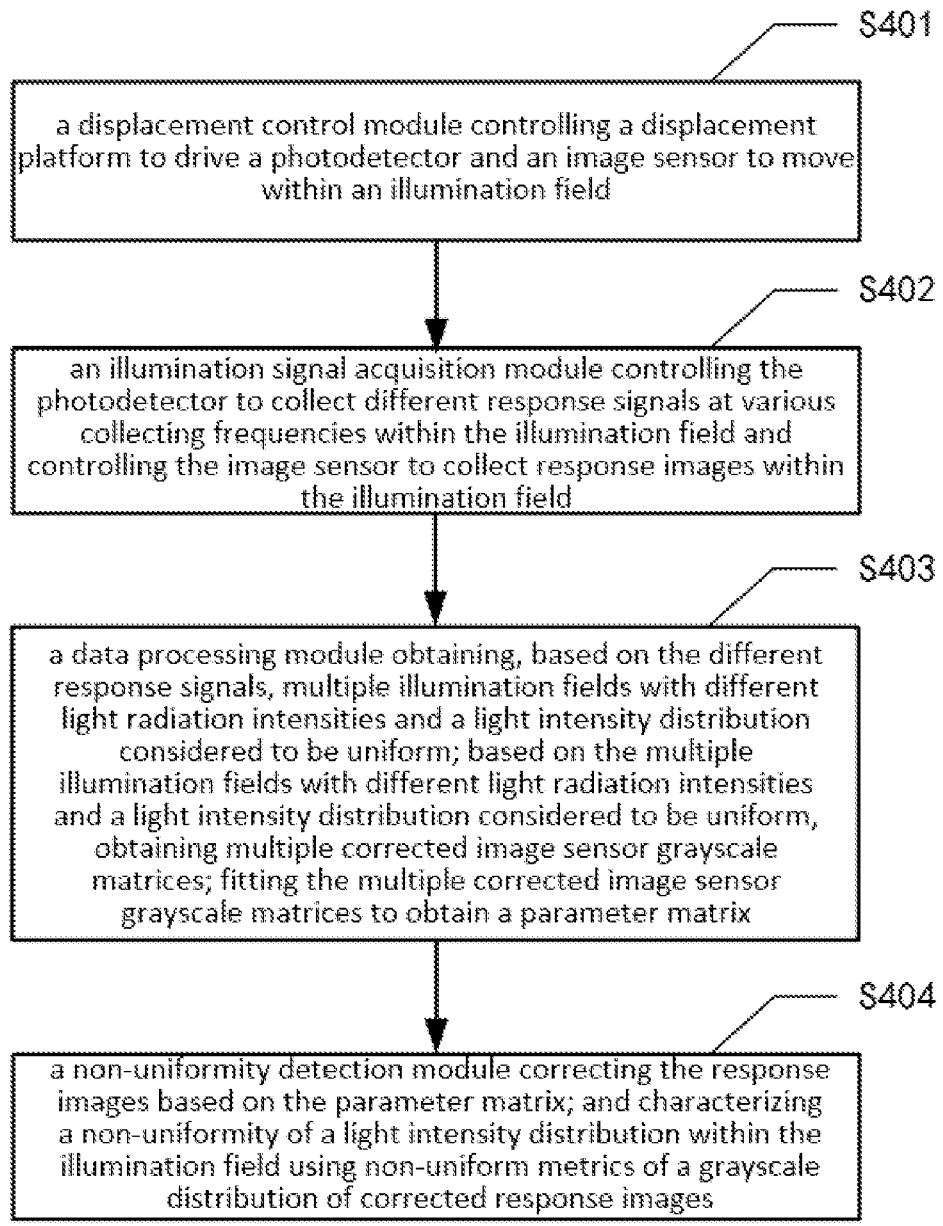
FIG. 4 schematically shows a flowchart of a method for detecting the non-uniformity of an illumination field according to the embodiments of the present disclosure.

FIG. 4 schematically shows a flowchart of a method for detecting the non-uniformity of an illumination field according to embodiments of the present disclosure.

As shown in FIG. 4, the illumination field non-uniformity detection method can, for example, include operations S401 to S404.

In operation S401: the displacement control module controls a displacement platform to drive a photodetector and an image sensor to move within an illumination field.

In operation S402: the illumination signal acquisition module controls the photodetector to collect different response signals at various collecting frequencies within the illumination field and controls the image sensor to collect response images within the illumination field.

In operation S403: the data processing module obtains, based on the different response signals, multiple illumination fields with different light radiation intensities and the light intensity distribution considered to be uniform; and based on the multiple illumination fields with different light radiation intensities and the light intensity distribution considered to be uniform, obtains multiple corrected image sensor grayscale matrices; and fits the multiple corrected image sensor grayscale matrices to obtain a parameter matrix.

In operation S404: the non-uniformity detection module corrects the response images based on the parameter matrix, and characterizes a non-uniformity of the light intensity distribution within the illumination field using non-uniform metrics of the grayscale distribution of the corrected response images.

It should be noted that the illumination field non-uniformity detection method in the embodiments of the present disclosure corresponds to the illumination field non-uniformity detection system in the embodiments of the present disclosure. The specific implementation details and the resulting technical effects are the same, and they are not repeated here.

Based on the same inventive concept, embodiments of the present disclosure also provide a correction method for the illumination field non-uniformity detection system.

Figure 5:
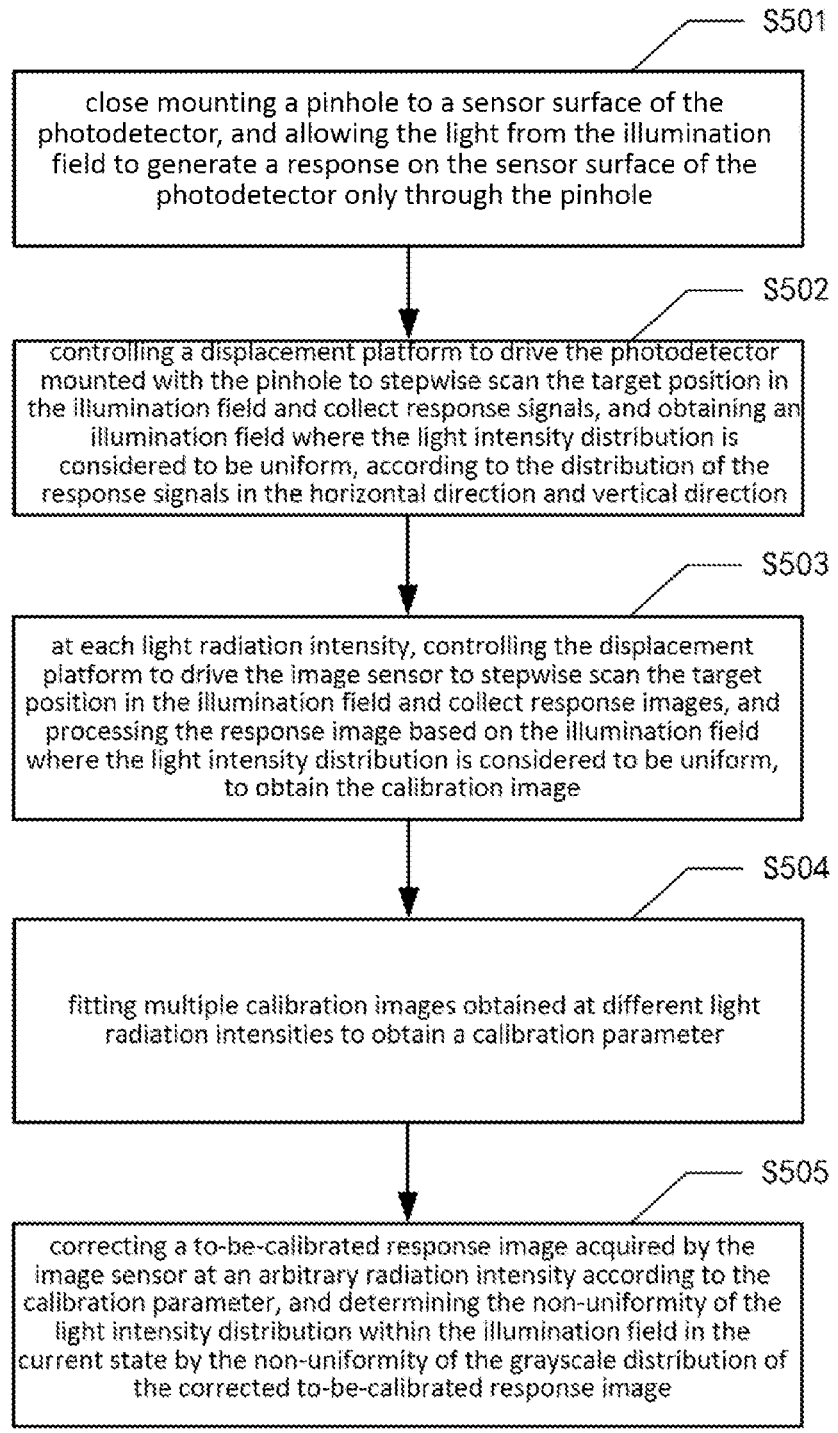
FIG. 5 schematically shows a flowchart of a correction method of an illumination field non-uniformity detection system according to the embodiments of the present disclosure.

FIG. 5 schematically shows a flowchart of a correction method of an illumination field non-uniformity detection system according to embodiments of the present disclosure.

As shown in FIG. 5, the correction method for the illumination field non-uniformity detection system can, for example, include operations S501 to S505.

The operation S501 involves close mounting a pinhole to a sensor surface of the photodetector, and allowing the light from the illumination field to generate a response on the sensor surface of the photodetector only through the pinhole.

The operation S502 involves controlling a displacement platform to drive the photodetector mounted with the pinhole to stepwise scan the target position in the illumination field and collect response signals, and obtaining an illumination field where the light intensity distribution is considered to be uniform, according to the distribution of the response signals in the horizontal direction and vertical direction.

The operation S503 involves, at each light radiation intensity, controlling the displacement platform to drive the image sensor to stepwise scan the target position in the illumination field and collect response images, and processing the response image based on the illumination field where the light intensity distribution is considered to be uniform, to obtain the calibration image.

The operation S504 involves fitting multiple calibration images obtained at different light radiation intensities to obtain a calibration parameter.

The operation S505 involves correcting a to-be-calibrated response image acquired by the image sensor at an arbitrary radiation intensity according to the calibration parameter, and determining the non-uniformity of the light intensity distribution within the illumination field in the current state by the non-uniformity of the grayscale distribution of the corrected to-be-calibrated response image.

The non-uniformity detection system provided in the embodiments of the present disclosure includes a displacement platform, a photodetector, and an image sensor. The displacement platform can move within the illumination field of the illumination system to be detected. The photodetector and the image sensor are mounted on the displacement platform, and the sensor surface of the image sensor and the sensor surface of the photodetector are perpendicular to the illumination optical axis and stable in the same plane.

Prior to performing operation S501, the embodiments of the present disclosure can also determine a time domain stability of the illumination system by capturing the power output of the illumination system by a photodetector at a predetermined time period (e.g., for 8 consecutive hours). After the time domain stability of the illumination system has been achieved, a pinhole is close mounted to the sensor surface of the photodetector.

If the continuous measurement reveals that the time domain of the illumination system is unstable, the time domain stability of the illumination system can be adjusted in at least one of the following ways: improving the experimental environment; or adjusting the parameters of the illumination source of the illumination system through circuit design; or adjusting the parameters of the illumination source of the illumination system through optical materials; or adjusting the parameters of the illumination source of the illumination system constructing a Proportional Integral Derivative model by using temperature feedback; or replacing the illumination source of the illumination system so as to, via regulation, avoid the effects of temperature, vibration and the quality of the lighting source itself on the time domain stability of the illumination system.

In the embodiment of the present disclosure, the method of obtaining an illumination field where the light intensity distribution is considered to be uniform, according to the distribution of the response signals in the horizontal direction and vertical direction is similar to the previous description of the step of the data processing module 130 obtaining, based on the different response signals, multiple illumination fields with different light radiation intensities and light intensity distribution considered to be uniform, which thus will not be repeated here.

For each method, the process of calculating the dimension of the illumination field considered to be uniform based on the distribution of response signals collected in rows and the distribution of response signals collected in columns can include, for example: setting a non-uniformity index; and calculating a spatial detection range of the illumination field in the horizontal and vertical directions based on the corresponding response values of the response signals in the horizontal and vertical directions and the non-uniformity index as a dimension of the illumination field where the light intensity distribution is considered to be uniform.

Continuing with reference to FIG. 2, based on the selected pinhole diameter and the desired non-uniformity index $PV_V$ of the illumination field, the illumination field with an area of $L_x \times L_y$ formed by stitching the light areas through the pinhole is chosen as the illumination field with an acceptable uniformity.

Specifically, the displacement platform enables the pinhole and the photodetector to perform a stepwise scan on the illumination field within the plane of the illumination field. The step distance is equal to or less than the diameter of the pinhole. Simultaneously, the response values of the photodetector at the corresponding positions are collected. In the embodiment, when the pinhole and the photodetector step along the x-direction (horizontal direction), the distribution curve of the response values of the photodetector along the x-axis is a parabola. It is possible to have differences in the response curves between various rows and columns. In other words, when the y-axis coordinates (vertical direction) of the rows scanned by the pinhole and the photodetector are different, the distribution curves of the obtained response values of the photodetector along the x-axis are distinct. Similarly, the distribution curve of the response values of the photodetector along the y-axis changes with the variation of the x-axis coordinates at the signal acquisition point.

Based on the collected results from the photodetector and the non-uniformity index $PV_V$ (the value of the non-uniformity index $PV_V$ is preset as actually needed), spatial detection ranges $L_x$ and $L_y$ are separately set for the illumination field in the x and y directions. $PV_V$ value is the absolute value of percentage of the difference between the maximum value $V_{max}$ and minimum value $V_{min}$ of the photodetector response output to their sum, calculated as $(V_{max}-V_{min})/(V_{max}+V_{min})*100\%$.

Since the response values collected from the illumination field form a three-dimensional curved surface, to simplify the selection of a uniform illumination surface, a rectangular uniform illumination surface is obtained.

If the distribution curves of the response data collected at any x-coordinate and any y-coordinate in the illumination field are both in Gaussian-like distribution, it can be approximately thought that the uniformity is best at the center of the illumination field. Therefore, when adopting the third method to obtain an illumination field considered to be uniform, the displacement platform enables the pinhole and the photodetector to perform stepwise scan in the plane of the illumination field along the x-direction and y-direction through the center of the illumination field, respectively.

In an embodiment of the present disclosure, a step length for the displacement platform to drive a photodetector mounted with a pinhole to stepwise scan a target position in an illumination field can be controlled to be less than or equal to a diameter of the pinhole.

According to user requirements and requirements on the non-uniformity index, the choice of the diameter of the precision pinhole and the step length of the displacement platform in a single axial direction can be customized. For instance, users can select any of the following solutions based on their own needs: non-uniformity index $PV_V<1\%$, and pinhole diameter: 5 μm-100 μm; non-uniformity index $PV_V$: 1%-5%, and pinhole diameter: 100 μm-500 μm; and non-uniformity index $PV_V>5\%$, and pinhole diameter: 500 μm-1 mm.

According to the embodiments of the present disclosure, three different options are provided for users to choose. Users can select a scheme based on their specific requirements, thereby enhancing the applicability of the correction method for the illumination field non-uniformity detection system.

In one embodiment of the present disclosure, the horizontal dimension and vertical dimension of the illumination field, where the light intensity distribution is considered to be uniform, are used respectively as the step lengths of the image sensor in the horizontal direction and vertical direction so as to collect response images at each target position.

Exemplarily, with the illumination system and illumination field fixed, and the illumination system stable and unchanged (including parameters such as radiation intensity, region size, and position), the displacement platform drives the image sensor to move in the x direction and y direction relative to the illumination field. The illumination field is scanned relative to the image sensor within the required area of the image sensor. The step length in the x direction of the displacement platform is denoted as $L_x$, and the step length in the y direction is denoted as $L_y$. The image sensor is controlled to continuously capture images n times after each step to the target position. After applying mean filtering, the grayscale distribution of the response image at the target position is obtained. Each target position has A×B pixel points. Mean filtering involves averaging the n-time response values V for each pixel point at any target position, which is $$\overline{V} = \frac{V_1 + V_2 + V_3 + \ldots + V_n}{n}$$

In one embodiment of the present disclosure, there are two ways to process the original image to obtain a calibration image based on the illumination field where the light intensity distribution is considered to be uniform.

Referring to FIG. 3, the two methods of processing the original image are the same as the two methods used by the aforementioned data processing module 130 to process the original image and obtain the calibration image and are thus not repeated here.

It should be noted that by keeping the illumination field unchanged and adjusting the energy to obtain N illumination fields with different radiation intensities $\varphi_k$ ($1 \leq k \leq N$), the above operation is repeated to obtain N calibration images.

According to the embodiments of the present disclosure, the step of fitting multiple calibration images to obtain a calibration parameter can comprise, for example, performing non-linear fitting on multiple calibration images to obtain calibration parameters that satisfy the condition of minimal residuals, wherein the calibration parameters can be expressed in the form of a polynomial parameter matrix, wherein the fitting model used for non-linear fitting is an S-curve or a high-order curve and the S-curve possesses a middle section having an approximately linear characteristic. Non-linear fitting can be done by least squares fitting.

Exemplarily, the calibration image can be converted into an image sensor grayscale matrix $M(\varphi_k)$. The median or mean $\overline{V}(\varphi_k)$ of the grayscale values $V_{(I,J)}(\varphi_k)$ of all pixel points in the image sensor grayscale matrix $M(\varphi_k)$ can be calculated. This value is then used as the corrected expectation value for all grayscale values in the image sensor grayscale matrix, with the same number of rows and columns as the image sensor grayscale matrix $M(\varphi_k)$. In the matrices, the matrix $\overline{M}(\varphi_k)$ in which each element has the value $\overline{V}(\varphi_k)$ is the corrected expectation matrix.

The model of the fitting function between the corrected expectation value $\overline{V}(\varphi_k)$ and the grayscale value $V_{(I,J)}(\varphi_k)$ of any pixel point (I, J) under the radiation intensity $\varphi_k$ is $$f(V_{(I,J)}(\varphi_k)) = a_{(I,J)}V_{(I,J)}(\varphi_k)^3 + b_{(I,J)}V_{(I,J)}(\varphi_k)^2 + c_{(I,J)}V_{(I,J)}(\varphi_k) + d_{(I,J)}$$

where $a_{(I,J)}$, $b_{(I,J)}$, $c_{(I,J)}$, and $d_{(I,J)}$ is calibration parameter.

Based on this, the sum of squares of the errors can be, for example:

$$a_{(I,J)}, b_{(I,J)}, c_{(I,J)}, d_{(I,J)} = \sum_{K=1}^{N} |f(V_{(I,J)}(\varphi_k)) - \overline{V}(\varphi_k)|^2.$$

Then the calibration parameter $a_{(I,J)}$, $b_{(I,J)}$, $c_{(I,J)}$, and $d_{(I,J)}$, that minimizes the sum of squared errors is found, i.e., the calibration parameter $a_{(I,J)}$, $b_{(I,J)}$, $c_{(I,J)}$, and $d_{(I,J)}$ that has the smallest residuals is found.

For different radiation intensities, it can be based on the following equation:

$$\begin{bmatrix} (V_{(I,J)}(\varphi_N))^3 & (V_{(I,J)}(\varphi_N))^2 & (V_{(I,J)}(\varphi_N))^1 & (V_{(I,J)}(\varphi_N))^0 \\ \vdots & \vdots & \vdots & \vdots \\ (V_{(I,J)}(\varphi_k))^3 & (V_{(I,J)}(\varphi_k))^2 & (V_{(I,J)}(\varphi_k))^1 & (V_{(I,J)}(\varphi_k))^0 \\ \vdots & \vdots & \vdots & \vdots \\ (V_{(I,J)}(\varphi_1))^3 & (V_{(I,J)}(\varphi_1))^2 & (V_{(I,J)}(\varphi_1))^1 & (V_{(I,J)}(\varphi_1))^0 \end{bmatrix} \begin{bmatrix} a_{(I,J)} \\ b_{(I,J)} \\ c_{(I,J)} \\ d_{(I,J)} \end{bmatrix} = \begin{bmatrix} \overline{V}(\varphi_N) \\ \vdots \\ [\overline{V}(\varphi_k)] \\ \vdots \\ \overline{V}(\varphi_1) \end{bmatrix}$$

So as to obtain the calibration parameter $a_{(I,J)}$, $b_{(I,J)}$, $c_{(I,J)}$, and $d_{(I,J)}$ that has the smallest residuals for any pixel point (I, J).

For the image sensor grayscale matrix M ($\varphi_k$), the parameter matrices A, B, C, and D that conform to the minimum residuals can be obtained after obtaining the calibration parameters $a_{(I,J)}$, $b_{(I,J)}$, $c_{(I,J)}$, and $d_{(I,J)}$ for all pixel points (I, J). The number of points in matrix A is the same as the number of points in the image sensor grayscale matrix M ($\varphi_k$). The value of each point in the matrix is $a_{(I,J)}$, and the other matrices B, C, and D are in the same situation, in which the value of each point in the matrices is $b_{(I,J)}$, $c_{(I,J)}$, and $d_{(I,J)}$, respectively.

According to the embodiments of the present disclosure, the step of correcting a to-be-calibrated response image acquired by the image sensor at an arbitrary radiation intensity according to the calibration parameter, and determining the non-uniformity of the light intensity distribution within the illumination field in the current state by the non-uniformity of the grayscale distribution of the corrected to-be-calibrated response image can comprise, for example, performing, similar to the one described earlier, a fitting operation on the grayscale value of each pixel point in the to-be-calibrated response image and the calibration parameter corresponding to the pixel point to obtain the corrected grayscale value of each pixel point; and calculating a non-uniformity index of the light intensity distribution within the illumination field in the current state based on the maximum grayscale value and the minimum grayscale value among the corrected grayscale values of all pixel points.

Exemplarily, in the illumination field to be tested, where the sensor surface of the image sensor is perpendicular to the illumination optical axis, the corrected grayscale value $\underline{V}'_{(I,J)}$ is obtained by multiplying the grayscale value $V'_{(I,J)}$ of the image sensor grayscale matrix M' corresponding to the to-be-calibrated response image acquired from the image sensor by the calibration parameters $a_{(I,J)}$, $b_{(I,J)}$, $c_{(I,J)}$, and $d_{(I,J)}$, where $$\overline{V}'_{(I,J)} = a_{(I,J)}V'_{(I,J)}{}^3 + b_{(I,J)}V'_{(I,J)}{}^2 + c_{(I,J)}V'_{(I,J)} + d_{(I,J)}.$$

Then, the maximum grayscale value $V_{max}$ and the minimum grayscale value $V_{min}$ among the corrected grayscale values of all pixel points are obtained, and the non-uniformity index value of the illumination field is calculated by $(V_{max}-V_{min})/(V_{max}+V_{min})*100\%$.

It should be noted that the V in the above $PV_V$ formula represents the response values of different acquisition devices, e.g., for photodetectors, it is the voltage value; and for image sensors, it is the grayscale value.

In the correction method for an illumination field non-uniformity detection system according to embodiments of the present disclosure, by combining the photodetector and the image sensor, the method first utilizes the photodetector to capture the illumination field where the light intensity distribution is considered to be uniform. Subsequently, the response images obtained by the image sensor are processed based on the illumination field where the light intensity distribution is considered to be uniform, thus obtaining a calibration parameter for the non-uniformity evaluation, which optimizes the application scenarios of the illumination field, thus enhancing the systematicness of the calibration and correction processes. It is particularly suitable for situations of measuring illumination field uniformity indicators where standard light sources are lacking.

Based on the same inventive concept, embodiments of the present disclosure also provide a correction device for the illumination field non-uniformity detection system.

Figure 6:
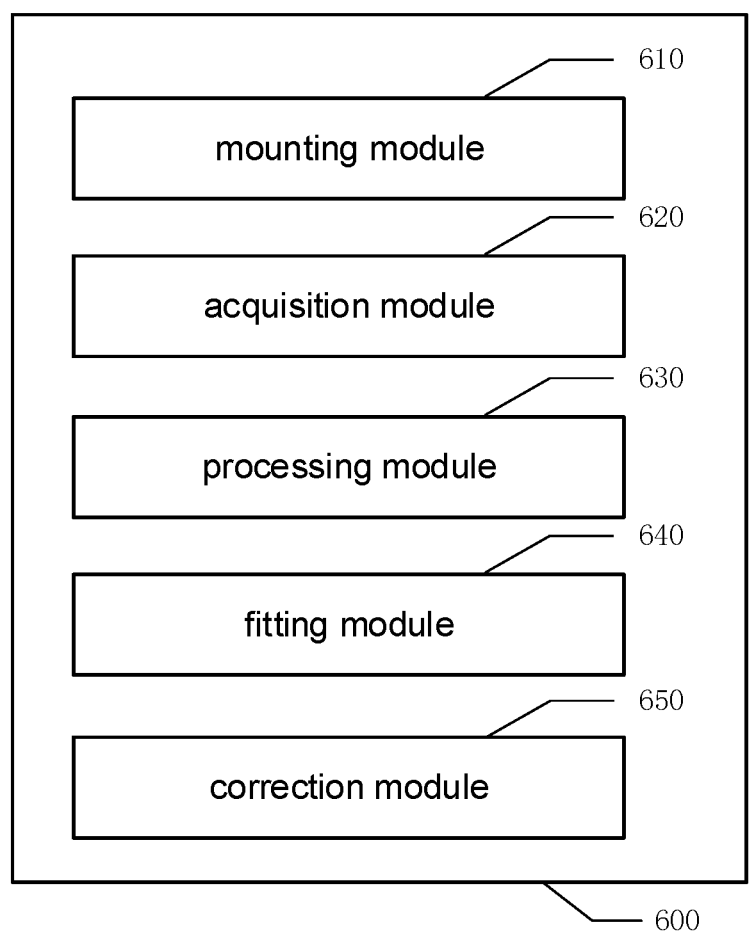
FIG. 6 schematically shows a block diagram of a correction device of an illumination field non-uniformity detection system according to the embodiments of the present disclosure.

FIG. 6 schematically shows a block diagram of a correction device of an illumination field non-uniformity detection system according to the embodiments of the present disclosure.

As shown in FIG. 6, the correction device 600 of the illumination field non-uniformity detection system can, for example, include a mounting module 610, an acquisition module 620, a processing module 630, a fitting module 440, and a correction module 650.

The mounting module 610 is configured for close mounting a pinhole to a sensor surface of the photodetector, and allowing the light from the illumination field to generate a response on the sensor surface of the photodetector only through the pinhole.

The acquisition module 620 is configured for controlling a displacement platform to drive the photodetector mounted with the pinhole to stepwise scan the target position in the illumination field to collect response signals, and obtaining an illumination field where the light intensity distribution is considered to be uniform, according to the distribution of the response signals in the horizontal direction and vertical direction.

The processing module 630, at each light radiation intensity, is configured for controlling the displacement platform to drive the image sensor to stepwise scan the target position in the illumination field to collect response images, and processing the response image based on the illumination field where the light intensity distribution is considered to be uniform, to obtain the calibration image.

The fitting module 640 is configured for fitting multiple calibration images obtained at different light radiation intensities to obtain a calibration parameter.

The correction module 650 is configured for correcting a to-be-calibrated response image acquired by the image sensor at an arbitrary radiation intensity according to the calibration parameter, and determining the non-uniformity of the light intensity distribution within the illumination field in the current state by the non-uniformity of the grayscale distribution of the corrected to-be-calibrated response image.

It should be noted that the correction device of the illumination field non-uniformity detection system in the embodiments of the present disclosure corresponds to the correction method of the illumination field non-uniformity detection system in the embodiments of the present disclosure. The specific implementation details and the resulting technical effects are the same, and they are not repeated here.

In the embodiments provided in the present disclosure, it should be understood that the systems or devices disclosed, can be realized in other ways. The above-described embodiments of the system connection circuit are merely schematic, for example, the division of the modules described, which is only a logical functional division, can be divided in another way when actually implemented; also, for example, multiple modules or components can be combined or can be integrated into another system, or some features can be ignored, or not implemented. On another point, the mutual coupling, direct coupling, or communication connection shown, or discussed herein can be an indirect coupling or communication connection through interfaces, devices, or modules, which can be electrical, mechanical, or other forms.

The units illustrated as separate components can/cannot be physically separated, and the components displayed as modules can/cannot be physical modules, i.e., they can be located in one place or distributed to a plurality of network modules. Some or all of these modules can be selected according to actual needs to achieve the objective of the embodiment solution.

Further, each functional module in each embodiment of the present disclosure can be integrated into a single processing module, each module can be physically present separately, or two or more modules can be integrated into a single module. The integrated modules mentioned above can be implemented both in hardware and in the form of hardware combined with software functional modules.

The integrated modules can be stored on a computer-readable storage medium when implemented as software function modules and sold or used as stand-alone products. With this understanding, the technical solution of the present disclosure can be embodied essentially or in part as a contribution to the prior art, or all or part of the technical solution may be embodied in the form of a software product, which is a computer software product stored in a storage medium comprising a number of instructions to cause a computer device (which can be a personal computer, a server, or a network device, etc.) to carry out all or some of the steps of the methods of the various embodiments of the present disclosure. The aforementioned storage media comprises various media that can store program code, such as various media that can store program code, such as USB flash drives, mobile hard drives, Read-Only Memory (ROM), Random Access Memory (RAM), disks, or CD-ROMs.

It should be noted that, for the various embodiments of the aforementioned methods, for the sake of simplicity in description, they are presented as a series of action combinations. However, those skilled in the art should understand that the present disclosure is not limited to the described sequence of actions. According to the present disclosure, certain steps can be performed in a different order or simultaneously. Furthermore, those skilled in the art should be aware that the embodiments described in the specification are preferred embodiments, and the actions and modules involved are not necessarily required for the present disclosure.

In the described embodiments, emphasis is placed on different aspects in each case, and parts not detailed in a particular embodiment can be referenced in the relevant descriptions of other embodiments.

The above is a description of an illumination field light intensity distribution non-uniformity detection system, detection method, calibration method, and device in the field of photoelectric detection provided by the present disclosure. For those skilled in the art, based on the principles of the embodiments of the present disclosure, there may be variations in specific implementation and application scenarios. In conclusion, the content of the summary should not be construed as limiting the scope of the present disclosure.

What is claimed is:

1. An illumination field non-uniformity detection system, comprising
    a displacement control module, configured for controlling a displacement platform to drive a photodetector and an image sensor to move within an illumination field;
    an illumination signal acquisition module, configured for controlling the photodetector to collect different response signals at various collecting frequencies within the illumination field and controlling the image sensor to collect response images within the illumination field;
    a data processing module, configured for obtaining, based on the different response signals, multiple illumination fields with different light radiation intensities and a light intensity distribution considered to be uniform; based on the multiple illumination fields with different light radiation intensities and a light intensity distribution considered to be uniform, obtaining multiple corrected image sensor grayscale matrices; and fitting the multiple corrected image sensor grayscale matrices to obtain a parameter matrix; and
    a non-uniformity detection module, configured for correcting the response images based on the parameter matrix; and characterizing a non-uniformity of a light intensity distribution within the illumination field using non-uniform metrics of a grayscale distribution of corrected response images.

2. The illumination field non-uniformity detection system according to claim 1, wherein the illumination signal acquisition module is further configured for controlling the photodetector to collect a power output of an illumination system during a predetermined time period to determine a time domain stability of the illumination system; and controlling, after achieving the time domain stability of the illumination system, the photodetector to collect the response signals.

3. The illumination field non-uniformity detection system according to claim 1, wherein the illumination signal acquisition module is therein provided with a data processing unit, a frequency setting unit, and a frequency verification unit, wherein
    when the data processing unit is turned on, the data processing unit performs a validity judgment on data detected by the photodetector each time and serves valid data as response data; when the data processing unit is turned off, the frequency verification unit serves all data detected by the photodetector as the response data;
    the frequency setting unit is configured for setting the collecting frequency; and
    the frequency verification unit is further configured for verifying, based on all the data, whether an actual frequency of the photodetector collecting the response signals is the same as the collecting frequency.

4. The illumination field non-uniformity detection system according to claim 3, wherein the data processing unit is provided with a first flag bit and a second flag bit, wherein
    under a condition where the data processing unit is set to the first flag bit, the illumination signal acquisition module continuously saves collected valid data; and under a condition where the data processing unit is set to the second flag bit, the illumination signal acquisition module saves an average value of all valid data collected in a single collection.

5. The illumination field non-uniformity detection system according to claim 4, wherein the first flag bit is wrapped using an asynchronous callback when the collecting frequency is greater than a frequency threshold.

6. The illumination field non-uniformity detection system according to claim 1, wherein the data processing module is further configured for:
obtaining a vertical dimension of an illumination field considered to be uniform based on a distribution curve of response data collected by the photodetector in a column corresponding to a vertex of a distribution curve of response data collected in any row of the illumination field; obtaining a horizontal dimension of the illumination field considered to be uniform based on a distribution curve of response data collected in a row corresponding to a vertex of the distribution curve of the response data collected in the column; or
obtaining multiple initial horizontal dimensions based on distribution curves of response data collected by the photodetector in each row of the illumination field, and determining a smallest initial horizontal dimension among the multiple initial horizontal dimensions as the horizontal dimension of the illumination field considered to be uniform; obtaining multiple initial vertical dimensions based on distribution curves of response data collected by the photodetector in each column of the illumination field, and determining a smallest initial vertical dimension among the multiple initial vertical dimensions as the vertical dimension of the illumination field considered to be uniform; or
obtaining the horizontal dimension of the illumination field considered to be uniform based on a distribution curve of response data collected by the photodetector in any row of the illumination field, and obtaining the vertical dimension of the illumination field considered to be uniform based on a distribution curve of response data collected by the photodetector in any column of the illumination field.

7. The illumination field non-uniformity detection system according to claim 6, wherein the data processing module is further configured for:
obtaining image response values of all pixel points at each target position, acquired by using the horizontal dimension and the vertical dimension of the uniform illumination field as step lengths of the image sensor in a horizontal direction and a vertical direction, respectively, and constituting an original image of the target position, respectively; and
processing the original image to obtain a calibration image and obtaining a corrected image sensor grayscale matrix based on a grayscale of each pixel point of the calibration image.

8. The illumination field non-uniformity detection system according to claim 7, wherein the data processing module is further configured for:
intercepting an image region in an original image at each target position with a horizontal dimension and a vertical dimension as a length and a width, and stitching image regions into a first intermediate image; traversing each pixel point in the first intermediate image with windowing, changing an image response value of pixel points that do not meet preset conditions to an average or median of image response values of all pixel points within a window in the first intermediate image, to obtain the calibration image; or
traversing each pixel point in the original image at each target position with windowing, changing the image response value of pixel points that do not meet the preset conditions to an average or median of image response values of all pixel points within a window in the original image, to obtain a second intermediate image corresponding to each target position; and
intercepting an image region in the second intermediate image at each target position with a horizontal dimension and a vertical dimension as a length and a width, and stitching image regions into the calibration image.

9. The illumination field non-uniformity detection system according to claim 1, wherein the displacement control module controls the displacement platform to drive the photodetector and the image sensor to move in a stepwise manner in a shape of a Chinese character "弓" within the illumination field.

10. An illumination field non-uniformity detection method, comprising:
controlling, by a displacement control module, a displacement platform to drive a photodetector and an image sensor to move within an illumination field;
controlling, by an illumination signal acquisition module, the photodetector to collect different response signals at various collecting frequencies within the illumination field and controlling the image sensor to collect response images within the illumination field;
obtaining, by a data processing module, based on the different response signals, multiple illumination fields with different light radiation intensities and a light intensity distribution considered to be uniform; obtaining, based on the multiple illumination fields with different light radiation intensities and a light intensity distribution considered to be uniform, multiple corrected image sensor grayscale matrices; and fitting the multiple corrected image sensor grayscale matrices to obtain a parameter matrix; and
correcting, by a non-uniformity detection module, the response images based on the parameter matrix; and characterizing a non-uniformity of a light intensity distribution within the illumination field using non-uniform metrics of a grayscale distribution of corrected response images.

11. A correction method of an illumination field non-uniformity detection system, applicable to the illuminated field non-uniformity detection system according to claim 1, comprising:
close mounting a pinhole to a sensor surface of the photodetector, and allowing a light from the illumination field to generate a response on the sensor surface of the photodetector only through the pinhole;
controlling the displacement platform to drive the photodetector mounted with the pinhole to stepwise scan a target position in the illumination field and collect the response signals, and obtaining an illumination field where a light intensity distribution is considered to be uniform, according to a distribution of the response signals in a horizontal direction and a vertical direction;
at each light radiation intensity, controlling the displacement platform to drive the image sensor to stepwise scan the target position in the illumination field and collect the response images, and processing the response images based on the illumination field where the light intensity distribution is considered to be uniform, to obtain calibration images;

fitting multiple calibration images obtained at different light radiation intensities to obtain a calibration parameter; and correcting a to-be-calibrated response image acquired by the image sensor at an arbitrary radiation intensity according to the calibration parameter, and determining the non-uniformity of the light intensity distribution within the illumination field in a current state by a non-uniformity of a grayscale distribution of a corrected to-be-calibrated response image.

12. The correction method of the illumination field non-uniformity detection system according to claim 11, wherein the method further comprising:

determining a time domain stability of an illumination system by capturing a power output of the illumination system by the photodetector at a predetermined time period; and after the time domain stability of the illumination system has been achieved, close mounting the pinhole to the sensor surface of the photodetector.

13. The correction method of the illumination field non-uniformity detection system according to claim 11, wherein the step of obtaining an illumination field where a light intensity distribution is considered to be uniform, according to a distribution of the response signals in a horizontal direction and a vertical direction comprising:

setting a non-uniformity index;

calculating a spatial detection range of the illumination field in the horizontal direction and the vertical direction based on corresponding response values of the response signals in the horizontal direction and the vertical direction and the non-uniformity index as a dimension of the illumination field where the light intensity distribution is considered to be uniform.

14. The correction method of the illumination field non-uniformity detection system according to claim 11, wherein the step of processing the response images based on the illumination field where the light intensity distribution is considered to be uniform comprising:

intercepting an image region at each target position in a response image, where a horizontal dimension and a vertical dimension of the illumination field where the light intensity distribution is considered to be uniform are used as a length and a width, respectively, and stitching image regions into a first intermediate image; traversing each pixel point in the first intermediate image with windowing, changing an image response value of pixel points that do not meet preset conditions to a median or average of image response values of all pixel points within a window in the first intermediate image, to obtain the calibration image; or traversing each pixel point in a response image of each target position with windowing, changing the image response value of pixel points that do not meet the preset conditions to a median or average of image response values of all pixel points within a window in the original image, to obtain a second intermediate image corresponding to each target position; and intercepting an image region at each target position in the second intermediate image, where the horizontal dimension and the vertical dimension of the illumination field where the light intensity distribution is considered to be uniform are used as a length and a width, respectively, and stitching image regions into the calibration image.

15. The correction method of the illumination field non-uniformity detection system according to claim 11, wherein the step of fitting multiple calibration images obtained at different light radiation intensities to obtain a calibration parameter comprising:

performing non-linear fitting on the multiple calibration images to obtain the calibration parameter that satisfies a condition of minimal residuals, wherein a fitting model used for the non-linear fitting is an S-curve or a high-order curve and the S-curve possesses a middle section having an approximately linear characteristic.

16. The correction method of the illumination field non-uniformity detection system according to claim 11, wherein the step of correcting a to-be-calibrated response image acquired by the image sensor at an arbitrary radiation intensity according to the calibration parameter, and determining the non-uniformity of the light intensity distribution within the illumination field in a current state by a non-uniformity of a grayscale distribution of a corrected to-be-calibrated response image comprising:

according to $$\overline{V}'_{(I,J)} = a_{(I,J)} V'_{(I,J)}{}^3 + b_{(I,J)} V'_{(I,J)}{}^2 + c_{(I,J)} V'_{(I,J)} + d_{(I,J)}$$

calculating a corrected grayscale value for each pixel point in the to-be-calibrated response image, where, $a_{(I,J)}$, $b_{(I,J)}$, $c_{(I,J)}$, and, $d_{(I,J)}$ are calibration parameters corresponding to a pixel point (I, J), $V'_{(I,J)}$ is a grayscale value of the pixel point (I, J) before correction and $\overline{V}'_{(I,J)}$ is a grayscale value of the pixel point (I, J) after correction; and calculating a non-uniformity index of the light intensity distribution within the illumination field in the current state based on a maximum grayscale value and a minimum grayscale value among corrected grayscale values of all pixel points.

17. The correction method of the illumination field non-uniformity detection system according to claim 11, wherein a step length, controlling the displacement platform to drive the photodetector mounted with the pinhole to stepwise scan the target position in the illumination field, is less than or equal to a diameter of the pinhole.

18. The correction method of the illumination field non-uniformity detection system according to claim 11, wherein a horizontal dimension and a vertical dimension of the illumination field where the light intensity distribution is considered to be uniform are used respectively as step lengths of the image sensor in a horizontal direction and a vertical direction so as to collect a response image at each target position.

19. The correction method of the illumination field non-uniformity detection system according to claim 12, wherein the method further comprising:

adjusting the time domain stability of the illumination system in a case of time domain instability in the illumination system, wherein an adjustment method comprises at least one of adjusting parameters of an illumination source of the illumination system through a circuit design;

adjusting the parameters of the illumination source of the illumination system through optical materials;

adjusting the parameters of the illumination source of the illumination system constructing a Proportional Integral Derivative model by using a temperature feedback; or replacing the illumination source of the illumination system.

\* \* \* \* \*